Patented Apr. 15, 1941

2,238,339

UNITED STATES PATENT OFFICE 2,238,339

PROCESS OF MAKING SOLUBLE STARCH

Walter A. Nivling, Newton, Mass.

No Drawing. Application August 22, 1938,
Serial No. 226,143

6 Claims. (Cl. 127—33)

This invention relates to processes of making soluble starch.

The natural starches, when separated from plant tissue, if heated with from eight to ten or more times of their weight of water and to a temperature of 140° F. or more, produce pastes which solidify on cooling and form jells. This tendency to form a jell limits their usefulness, since for many industrial purposes a starch is required which, when heated with as little as two to three times its weight of water, will be freely fluid when cool and will remain fluid for at least several hours. Such a change or modification of the natural characteristics of starch may be brought about by the well known process of dextrinizing, which consists in acidulating the starch with any of several acids such, for example as hydrochloric, nitric, sulphuric or others, and carrying on the treatment in the dry state by heating or roasting for from one-half to several hours. This method of converting results in the formation of varying percentages of dextrose and also in the sacrifice of the natural white color of starch, both of which, for some uses, are objectionable.

Another method of converting starch, or rendering it "thin boiling," consists in treating the starch with acids and such percentages of water as may be convenient. By this method the gelatinizing or jell-forming property of starch may be very gradually reduced.

A third known method of modifying the paste forming characteristics of natural starch consists in treating the starch in the presence of water with oxidizing chemicals, such as peroxides, persulphates, perborates, permanganates or hypochlorites. The product resulting from treating starches with suitable amounts of oxidizing chemicals is known as "soluble starch." Soluble starches have serviceable properties not possessed by acid-hydrolized, thin boiling starches, or by dextrines, and they may, therefore, be considered as a distinct class of modified starches. They have properties and characteristics, peculiar to themselves, which make them highly useful in many of the industrial arts.

Starch may be converted into soluble form by two general methods. One method consists in adding water and usually a suitable oxidizing chemical or chemicals to the starch, with or without heat, as circumstances may require. After the desired degree of conversion is effected, the undesirable impurities and by-products, together with the water, may be removed by sedimentation or filtration and subsequent drying. The conversion of starch to a soluble form by this very generally used process is attended with a relatively high and unavoidable loss of starch.

Another method of converting starch to soluble form consists in mixing the oxidizing converting chemicals with the starch, later adding water, and effecting the conversion by heating, so that conversion and cooking are effected in one operation. This process, while having the advantage of lower cost than the method first given, has the disadvantage of lack of uniformity and the further disadvantage of producing a solution of soluble starch of inferior quality due to the presence of impurities and by-products formed by the chemical reaction. These cannot be removed since the starch produced by this method is in solution. A further disadvantage of this method is that the converted starch is not transportable, except at unwarranted cost for transporting water.

I have developed a new method possessing advantages over either of the foregoing general processes, in that a soluble starch, free from objectionable impurities, is produced with practically no loss of starch since the residual by-products are present in such small amounts as not to interfere with its usefulness for a number of purposes. It also has the further advantage of effecting a substantial improvement in quality as well as a saving in the amount of converting chemicals required.

My new method consists in effecting the conversion in two stages, instead of in one stage, as has heretofore universally been done, together with the introduction of an intermediate purifying step. For example, any starch or starch-bearing material may be suspended in water and suitable converting chemical or chemicals such, for example, as hypochlorite of soda, hypochlorite of lime or sodium- or potassium permanganate, may be added in an amount sufficient to render impurities soluble and simultaneously to effect a conversion of the starch to a semi-soluble form. The amount of converting chemical or chemicals to be added will vary with different types of starch, such as potato, corn, wheat, rice, sago, tapioca or other starchy matter, and also according to the degree of growth or development of the starch grains. But, in general, the amount to be added is such as will induce about three-fourths, for example, of the desired total conversion. Various means may be employed to determine the amount of conversion thus far effected such, for example, as taking a sample, quickly filtering away the greater part of the water, re-suspending in pure water, and again filtering, then testing the filter cake by boiling with water and noting its behavior, or comparing it with samples of known composition. After this degree of conversion has been effected, the water and impurities are removed by sedimentation or filtration with subsequent completion of the drying to a point suitable for making the product merchantable in the dry powder state.

During this subsequent drying, the second step of my process may be effected by adding to the starch, at any convenient point after the removal of impurities, an additional quantity of a converting chemical, such as one of those above mentioned, and then completing the drying. This second addition of chemical results in conversion to a still more highly soluble form. Only a small proportion of chemical required for this purpose. It may be sprayed on or otherwise incorporated with the partly dried material while it is being transferred by a conveyor, since the quantity of chemical so added to the starch need not be sufficient to wet the material to such a degree as to interfere with the conveying operation. Also, this conveying step may be utilized to produce a mixing action serving to distribute the chemical uniformly throughout the body of starch or to blend in other modifying starches or chemicals, as desired.

Or after a greater part of the water, together with the impurities, has been removed and before subjecting the material to any drying operation, the starchy matter may be re-suspended in water and the previous treatment may be repeated by a second or a third addition of chemical, or chemicals, designed to complete the conversion. Any amount of water so added may be merely enough to facilitate the distribution of the converting chemical uniformly throughout the body of starch. Following the addition of such further converting agent, the starch may be dried and it is then ready to be shipped. While some undesirable by-products may be formed in the second or subsequent steps, the proportion of them is so small as to be unobjectionable.

This process is particularly useful in making a soluble starch which can readily be dissolved in water by boiling and will, when subsequently cooled to room temperature, remain freely fluid and show no substantial precipitation even after standing for a considerable length of time. A product of this character finds a wide use in the sizing of textile goods, papers, and for various other purposes. This process is of advantage in effecting a substantial economy in the manufacture of a product of this type, both because of the reduction in starch losses and also in reducing the expense of handling and for the chemicals required.

A process such as that above described lends itself conveniently to introduction in the process of manufacture of starches by methods in which the entire mass must be handled in a liquid or fluid form, both before and after the separation of the bran, fibre and other adventitious matter. That is, the process of converting the starch into a soluble form may be introduced well along in the starch making process as, for example, after a high percentage of the undesirable by-products have been removed by processes usually employed in the manufacture of starch and while the starch is still suspended in water. In fact, starchy matter responds more readily and/or is more easily purified if treated in the original wet state than if dried and subsequently rewetted for treatment purposes.

In this connection, however, it may be pointed out that one of the objections to prior commercial processes of making soluble starch by conversion with oxidizing agents has involved the addition of large quantities of water with the result that the chemicals are dispersed in a very dilute and less active state. This has been regarded as a necessary condition in order to prevent the oxidizing chemicals from attacking the starch with such destructive violence as to rupture some of the starch granules, with a resultant loss of both starch and chemicals. Moreover, in such a conversion a collateral action is sought; namely, that of so acting upon the impurities present in the starch such, for example, as oily constituents, gluten, fibre and the like, that they may be readily removed.

I have found that both the conversion of starch and the desired action on the impurities can be accomplished more rapidly, economically and effectively by adding the oxidizing chemicals in a relatively concentrated state and combining therewith a retarding chemical, or chemicals, which delay the attack on the starch. Preferably, the starch or starch material is treated while in a concentrated watery suspension, and the mass is agitated sufficiently to insure a uniform distribution of the chemical there-through. In general the process may be like that above described, except for the fact that the chemical is in much more concentrated state. After the conversion has proceeded to the desired degree, the objectionable impurities may be in a large part removed by sedimentation, decantation or filtration. The partly converted starchy material then is subjected to a second treatment as above described and subsequently is dried. This method will produce a superior product, more completely converted, having a higher degree of solubility and purity, whiter in color and at a very material saving in expense.

When a product of exceptionally high quality is desired, the purifying and converting steps may again be repeated.

The retarding agent associated with the oxidizing chemical or mixture of chemicals to control the rate of the reaction in the process just described may consist, for example, of basic substances such as caustic soda or soda ash, caustic potash or potassium carbonate, or combinations of the same. It appears that most basic substances have this retarding action. Obviously, however, the retarding substance must be stable in the presence of the active oxidizing agent used. This, therefore, precludes the use of ammonia compounds which are broken down by active oxidizing agents such, for example, as sodium hypochlorite. I have also found that those basic substances which form colloidal solutions such, for example, as sodium stearate, sodium resinate, sodium silicate or triethanolamine are more effective as retardants than the basic substances such as soda ash, caustic soda or caustic potash which form true or molecular solutions. It may be that any substances which form colloidal solutions, whether basic or not, may act as retardants by virtue of their colloidal character which would inhibit or retard the penetration of the active oxidizing chemical, but whatever the explanation, I have found that colloidal basic substances such as sodium silicates may at times be preferable, the materials being selected with due regard to the nature of the reacting chemical and to each other. In general, it may be stated that the proportion of basic substance or colloidal material added to the converting chemical will be in the order of about one-half to five per cent of the chemical solution used for converting.

For example, a suitable chemical may consist of a solution of sodium hypochlorite sufficient to deliver approximately four per cent of oxygen, calculated on the dry weight of the starch, and adding to every hundred pounds of this solution, approximately two pounds of caustic soda. With such a solution the converting reaction will proceed more slowly, orderly and economically than if the caustic soda had been omitted. Also if sodium silicate is substituted for all or part of the caustic soda, the reaction will be further retarded. The operator, therefore, is enabled to adjust the rate of reaction and the amount of conversion produced to obtain the desired end product uniformly.

In the manufacture of some starchy product such, for example, as wheat flour, the entire process is carried out in a substantially dry state. For the treatment or conversion of the starchy parts of such flours or other starchy meals, only a minimum quantity of water or solution of oxidizing chemicals may be added, the total quantity being so limited that the material is maintained in a dry or powdery condition throughout the process. For such conversion the process described and claimed in my pending application, Serial Number 161,052, is admirably adapted. In fact this process may at times be used to advantage as one step of the multi-stage process described in the present application.

As a further variation, I may carry out the first step of my process in another way; that is, by first modifying the starch by treatment in the commercially dry state with acids or with gaseous chemicals of the halogen group such, for example, as chlorine, until the starch has been so far converted that when heated with water, it forms a very thin, non-gelatinizing starch paste, and then applying the second and/or third step of my process, consisting in the addition of oxidizing and/or purifying or modifying substances. The advantage of this alternate method of my process is that a soluble starch is obtained with almost no loss of starch and with a minimum of chemicals required to effect the conversion to the soluble form. This alternate process does not produce a product of as good quality as does my method first described, but it yields a product suitable for many purposes.

It will be evident from the foregoing that the invention provides a method of making soluble starches which has the advantages of effecting economies in the converting process, maintaining such control of the reactions as to give the desired end products and adapting the conversion to the method of manufacture of starchy materials prior to the converting treatment.

This application is a continuation, in part, of my pending application Serial No. 711,403, filed February 15, 1934, for improvements in Processes of making soluble starch.

Having thus described my invention, what I desire to claim as new is:

1. The process of rendering starch soluble by first converting the starch to a semi-soluble form by acting on the starch in the presence of water with suitable converting chemicals; then purifying by removing the water, together with the undesired by-products by sedimentation or filtration; then completing the conversion to the required degree of solubility by adding an oxidizing agent to the material so treated, and completing the drying.

2. That improvement in processes of converting starch into a soluble form, which consists in acting chemically on the starch to convert it into a semi-soluble form, separating the partly converted starch from the soluble impurities and undesirable by-products formed during said partial conversion, and then adding an oxidizing agent to the starch so treated to produce a further conversion of the product so formed into a soluble form.

3. That improvement in processes of converting starch into a soluble form, which consists in partly converting the starch by chemical action in the presence of water and thereby changing it into a semi-soluble form, filtering off the undesirable by-products formed during such conversion and thereby separating them from the partly converted starch, drying said partly converted product, and after said separation of impurities, adding a sufficient quantity of an oxidizing chemical to substantially complete the conversion of the starch.

4. That improvement in processes of converting starch into a soluble form, which consists in partly converting the starch by chemical action in the presence of water and thereby changing it into a semi-soluble form, filtering off the soluble impurities and the undesirable by-products formed during such conversion and thereby separating them from the partly converted starch, removing some of the water from the product so formed, and thereafter spraying a sufficient quantity of an oxidizing chemical on said partly dried product to substantially complete the conversion of the starch into a soluble form.

5. That improvement in processes of converting starch into a soluble form, which consists in treating starch in its commercially dry state with cholrine in a gaseous form until the starch has been so far converted that when heated with water it forms a thin, non-gelatinizing paste, and subsequently treating the product so formed with an oxidizing chemical to substantially complete the conversion of the starch into a soluble form.

6. That improvement in processes of converting starch into a soluble form, which consists in acting chemically on the starch to convert it into a semi-soluble form, separating the partly converted starch from the soluble impurities and undesirable by-products formed during said partial conversion, later adding an oxidizing agent to the starch so treated to produce a further conversion of the product so formed into a soluble form, and controlling the rate of reaction of said oxidizing agent on the starch by intimately mixing therewith a small proportion of a chemical substance of a stable basic nature serving to retard the rate of the reaction of the oxidizing agent on the starch.

WALTER A. NIVLING.